Aug. 4, 1942.   G. BUCKY   2,292,044
ILLUMINATION FOR CAMERAS
Filed Aug. 28, 1940
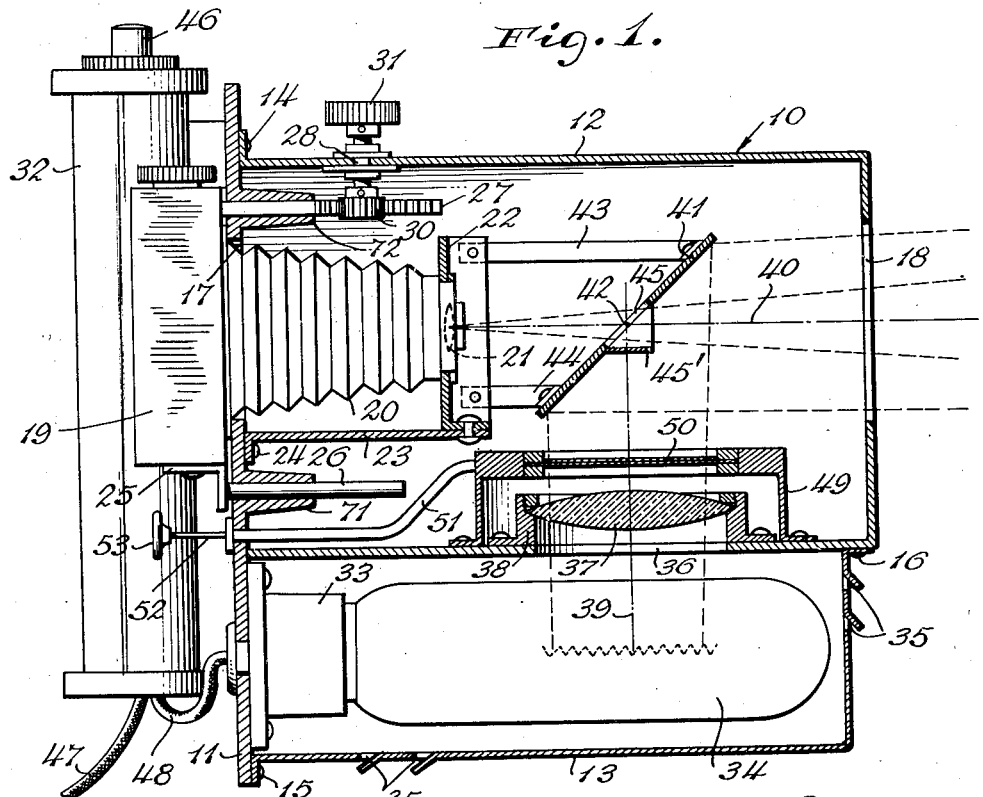
Fig. 1.
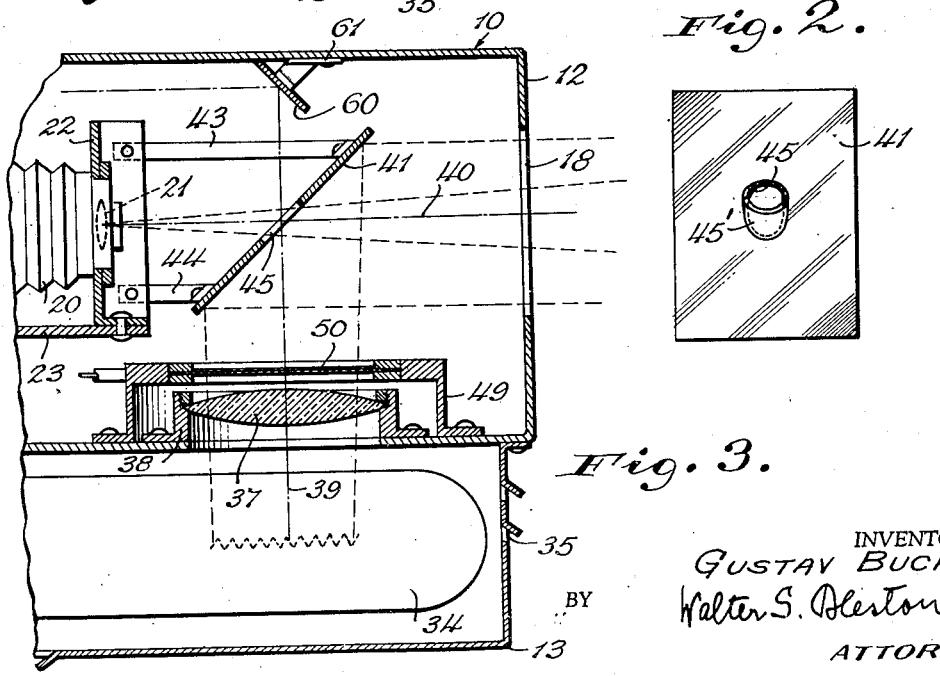
Fig. 2.
Fig. 3.
INVENTOR.
GUSTAV BUCKY
BY Walter S. Alston
ATTORNEY Patented Aug. 4, 1942

2,292,044

UNITED STATES PATENT OFFICE 2,292,044

ILLUMINATION FOR CAMERAS

Gustav Bucky, New York, N. Y.

Application August 28, 1940, Serial No. 354,499

1 Claim. (Cl. 240—2)

This invention relates to a system and apparatus for illuminating an object or scene to be photographed and upon which the photographic camera is directed. The present application is a continuation-in-part of my co-pending application Serial No. 270,519 filed April 26, 1939.

The invention contemplates the provision of a light source and other means in combination with a photographic camera whereby a beam of light will be directed upon an object on which the camera is focused, independently of its distance from the camera objective, or vice versa, whereby the photographic camera will be properly directed upon the object when the latter is hit by said beam of light.

Broadly, my invention comprises in combination a light source arranged laterally of the axis of the camera objective, and a reflector in front of said objective and so arranged as to reflect a light beam from said source substantially in the direction of the object upon which the camera is focused, and a shutter so operable as to prevent light rays of said source from impinging on said reflector before said light source has reached full power.

Further objects and details of my invention will be apparent from the hereinafter description of an embodiment thereof illustrated by way of example in the accompanying drawing in which:

Fig. 1 is a longitudinal section of a camera with illuminating means according to my invention, Fig. 2 is a front elevation of a part thereof, and Fig. 3 is a longitudinal section of a modification of the device shown in Fig. 1.

Referring, now, to the drawing and more particularly to Fig. 1, a housing 10 is provided which comprises a base plate 11, a main portion 12, and a lateral attachment 13. The part 12 is secured to the base plate 11, and the attachment 13 to the base plate and part 12 as indicated at 14, 15 and 16. The base plate and part 12 are provided with two opposite apertures 17 and 18 respectively. The camera chiefly comprises a box-like part 19 containing the conventional equipment for receiving a photographic plate or film, the bellows 20 and the usual objective or lens 21 with mount 22. One of the two parts, box and objective, is movable relatively to the other one for the adjustment of their spacing from each other to obtain a desired focal distance. In the preferred form of the illustrated embodiment, the box 19 is arranged rearwardly of the aperture 17 through which the bellows 20 extends with the objective 21 opposite the aperture 18 of housing part 12. The objective mount 22 is secured to a bracket 23 secured at 24 to the plate 11 interiorly of the housing part 12. The box 19 is fixed to a carriage 25 which is provided with forwardly projecting rods 26, only one being shown, guided in a boss-like projection 71 of the plate 11. Means are provided for shifting the box 19 relatively to the objective 21 in the direction of the axis of the latter in order to focus the camera on an object to be photographed. Such means are shown as a rack 27 secured to the front of the box 19. The rack projects through a guide boss 72 into the housing part 12. A shaft 28 is journaled in the said part 12 at 29, and a pinion 30 meshing with the rack 27 is mounted on the inner end of the shaft, whereas the other end is provided with a knurled grip or knob 31. A handle 32 is attached to the base plate 11 so that the camera may be held by it during an exposure, and it will be apparent that the focal distance of the objective from the film or plate may be adjusted by turning knob 31. Other conventional accessorial parts of a camera may be present but are not shown, as they are no part of the present invention. Means are provided to illuminate an object upon which the camera is directed. For this purpose, a lamp socket 33 is secured to the base plate 11 interiorly of the attachment 13, and a bulb 34 is fastened in socket 33. The attachment 13 may be provided with baffled slots 35 serving to ventilate the interior thereof. The housing wall between the camera parts and the lamp has an aperture 36, and to the rim of such aperture a condenser 37 is attached by means of a mount 38 so that the axis 39 of a light beam from the light source 34 intersects the axis 40 of the camera objective or lens 21. A reflecting means such as a mirror 41 is provided with its center at the point of intersection 42 of the axes 39 and 40 and held in position by suitable means such as brackets 43 and 44 which are secured to the mount 23. The reflector or mirror 41 is so arranged that a beam with the axis 39 will be reflected in the direction of and substantially coaxial with the objective axis 40 towards the aperture 18. In the preferred form illustrated in Fig. 1, the axes 39 and 40 intersect each other at right angles and the plane mirror 41 is consequently arranged with an inclination of 45° with respect to both said axes 39 and 40. However, it will be apparent that the mirror will be arranged at another angle if the beam axis includes with the objective axis an angle differing from 90°. Mirror 41 has an aperture or substantially non-reflecting central portion 45 of suitable size and configuration to permit incident light rays to pass from the outside through apertures 18 and 45 towards the lens 21 and to impinge on a film or plate in the camera box 19.

In order to cause the passage of a beam of substantially circular cross-section through aperture 45, the latter has an elliptical outline in view of the inclination of mirror 41 as clearly shown in Fig. 2. It will be clear that it is advisable to make the size of aperture 45 as small as possible in order to reduce the size of the non-reflected core of the beam from the light source. On the other hand, the aperture should be sufficiently large in order to ensure that the entire beam or bundle of rays which carries the object image can pass through the aperture to the lens without obstruction. The correct size of the aperture of the mirror can be easily found by taking into account the maximum objective opening, the distance of the center of the mirror from that of the lens 21, and the optic angle of the lens. It is desirable to ensure that no light rays originating from the lamp 34 and passing through aperture 45 will be reflected towards lens 21 from a surface interiorly of the housing 12. For this reason, a screen 45' may be attached to the mirror along at least that portion of the contour of aperture 45 which is nearest to the lamp 34. In the illustrated embodiment said screen is shaped as a tube having a base at 45° to its axis according to the inclination of the mirror. Thus, screen 45' prevents any direct rays from entering through aperture 45 into the upper portion of the housing 12.

For the purpose of operating the light source, a switch as indicated at 46, may be provided e. g. in connection with the handle 32, and lead wires 47 and 48 may connect the lamp socket 33 via the switch 46 to a current source (not shown). It is a well-known fact that an incandescent lamp requires a certain length of time, though only fractions of a second, to reach full power after the current is switched on. However, in many instances, it is desirable to ensure full brightness of the lamp before the light beam from the lamp is cast upon the object to be photographed. To accomplish this, a shutter may be provided in the path of said beam between the lamp 34 and reflector 41. In the embodiment of Fig. 1, a tubular mount is attached with one of its ends to the housing portion 12 so as to encompass the condenser 37. A shutter device 50 is carried by the other end of mount 49. It may be of any suitable type such as is, for instance, conventional in connection with photographic objectives. Means for controlling the shutter are indicated as a pipe 51 with interior flexible push rod 52 ending in a button or the like 53 on the outside of the camera housing. As usual in shutters of said type, the arrangement may be so that a first actuation of button 53 will open the shutter, and a second actuation will close the shutter.

In using the camera according to my invention, switch 46 may be actuated to energize the lamp 34, then shutter 50 may be opened with the aid of the button 53. Consequently, a light beam will pass from the lamp 34 through the condenser 37 and the opening of the shutter 50 towards the mirror 41. Except for a center portion hitting the screen 45', the beam will be reflected by the mirror in the direction of the axis 40 so as to leave the housing through aperture 18. Now, it will be apparent that the entire camera will be properly directed upon an object illuminated by the reflected beam independently of the distance of said object from the camera, because the axis of said reflected beam coincides with the objective axis. From the view point of uniform distribution of light over the illuminated area, the non-reflecting portion of the mirror has not been found to be a drawback.

In practice such central portion is sufficiently small in relation to the reflecting surface of the mirror to prevent the formation of an appreciable black core of the reflected beam. Furthermore, the condenser tending to arrange the individual rays of the beam parallel to each other is usually not so efficient as to prevent a certain aberration of rays which will fill the dark core at least in the neighborhood of the object.

The camera may be focused by turning the knob 31 until the correct relative distance of object, lens and film is attained. The beam carrying the image of the object to be photographed travels interiorly of the beam reflected from the mirror, and passes through the aperture 45 of the mirror so as to impinge on the camera lens 21. When the exposure has been made, the shutter 50 may be closed by actuating button 53, and the current to the lamp may be switched off at 46.

It has been hereinbefore explained that during the illumination of the object to be photographed, the screen 45' prevents rays of the lamp 34 from passing through the aperture 45 into the housing portion on the other side of the mirror and from being cast upon the lens by reflection from parts interiorly of the housing. Fig. 3 illustrates a modified means serving a similar purpose in connection with a camera as shown in Fig. 1. In this modified form, the aperture 45 of mirror 41 is freely exposed to rays from the light source which may pass therethrough into the housing portion on the opposite side of the mirror. In the path of these rays, i. e. on the beam axis 39 and behind the mirror 41, another reflector 60 is provided which may be of the type disclosed in my Patent No. 2,239,379 granted April 22, 1941. This reflector is attached to the housing 12 by means of a bracket 61. In its preferred form it consists of a plane black glass surface arranged at such an angle with respect to the axis 39 that those rays which are not absorbed by the black surface will be diverted from the objective 21 by reflection.

Various changes in the specific form of my invention particularly in the arrangement and configuration of the several parts thereof may be made without departing from the spirit of the invention. I desire it to be understood, therefore, that my invention is limited only by the scope of the appended claim.

I claim:

A photographic camera comprising a bipartite housing including a partition between the first and second housing part, an objective mounted in the first housing part with its axis substantially parallel to said partition and opposite a first aperture in a housing wall adjacent said partition, said partition having a second aperture, a plane reflector between said objective and said first aperture and being inclined approximately 45° with respect to the objective axis and having a small aperture at its center, the center of said reflector being located substantially in the intersection of said axis and of a line through the center of said second aperture and perpendicular with respect to said axis, a film carrier opposite said first aperture with respect to said objective, a light source in said other housing part and opposite said second aperture, a switch for said light source, a condenser lens and a shutter in front of said second aperture.

GUSTAV BUCKY.